(12) United States Patent
Chen et al.

(10) Patent No.: US 10,949,480 B2
(45) Date of Patent: Mar. 16, 2021

(54) PERSONALIZED PER-MEMBER MODEL IN FEED

(71) Applicant: Microsoft Technology Licensing, LLC, Redmond, WA (US)

(72) Inventors: Boyi Chen, Sunnyvale, CA (US); Yijie Wang, Sunnyvale, CA (US); Timothy Paul Jurka, Redwood City, CA (US); Ying Xuan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 453 days.

(21) Appl. No.: 15/900,219

(22) Filed: Feb. 20, 2018

(65) Prior Publication Data

US 2019/0258741 A1     Aug. 22, 2019

(51) Int. Cl.
| | |
|---|---|
| *G06F 16/9535* | (2019.01) |
| *G06Q 50/00* | (2012.01) |
| *G06N 20/00* | (2019.01) |
| *G06F 16/2457* | (2019.01) |

(52) U.S. Cl.
CPC .... *G06F 16/9535* (2019.01); *G06F 16/24578* (2019.01); *G06N 20/00* (2019.01); *G06Q 50/01* (2013.01)

(58) Field of Classification Search
CPC .......... G06F 16/9535; G06F 16/24578; G06F 16/9536; G06N 20/00; G06N 3/0454; G06N 7/005; G06N 20/10; G06N 5/003; G06N 20/20; G06Q 50/01

See application file for complete search history.

(56) References Cited

U.S. PATENT DOCUMENTS

| | | | |
|---|---|---|---|
| 9,747,647 B2 * | 8/2017 | Ruan | G06Q 50/01 |
| 2016/0224559 A1 * | 8/2016 | Hicks | G06F 16/24578 |
| 2016/0358229 A1 * | 12/2016 | Bhalgat | G06Q 50/01 |
| 2018/0089318 A1 * | 3/2018 | Chatterjee | G06F 16/9038 |

\* cited by examiner

*Primary Examiner* — Albert M Phillips, III
(74) *Attorney, Agent, or Firm* — Schwegman Lundberg & Woessner, P.A.

(57) ABSTRACT

In an example embodiment, a GLMix model is utilized that models viewers and actors of feed items. This allows for random effects of individual viewers and actors to be taken into account without introducing biases. Additionally, in an example embodiment, predictions/recommendations are made more accurate by using three models, which are then combined, instead of a single GLMix model. Each of these models has different granularities and dimensions. A global model may model the similarity between user attributes (e.g., from the member profile or activity history) and item attributes. A per-viewer model may model user attributes and activity history of actors on feed items. A per-actor model may model user attributes and activity history of the viewers of feed items. The per-actor model may therefore, rely on information regarding how and what type of viewers interacted with items acted on by the particular actor.

20 Claims, 9 Drawing Sheets

PERSONALIZED PER-MEMBER MODEL IN FEED

TECHNICAL FIELD

The present disclosure generally relates to technical problems encountered in providing personalized predictions on computer networks. More specifically, the present disclosure relates to the use of generalized additive mixed effect machine-learned models for personalized predictions.

BACKGROUND

Social networking services are online platforms that people use to build social networks or social relations with other people. In recent years it has become popular for social networking services to provide feeds to users where updates or items of interest can be presented to users who have logged into the service. The feed may contain, for example, indications that a social networking connection for a user has been promoted, has changed jobs, and the like. The feed may also contain articles of interest to the user, either because they have some connection to one or more of the user's social networking connections (e.g., an article written by a friend) or because they are linked to an area of interest for the user, as identified by the social network service (e.g., the article is on a subject the user has identified as an area of interest in their user profile).

It can be challenging for the social networking service to determine which of many potential items should be displayed in the feed and the order in which they should be displayed. This is typically handled via one or more algorithms implemented by the social networking service for selection and ranking of potential items to display. These algorithms, however, are based on determining the likelihood that the user will interact with the item in some way (e.g., select it, share it, like it, etc.) using a single machine learned model. A single machine learned model, however, means that all members share the same weight globally. Thus, despite the fact that members may receive personalized scores based on their own data (such as past interactions), the scores are biased due to data from other members impacting how the single machine learned model calculates scores.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
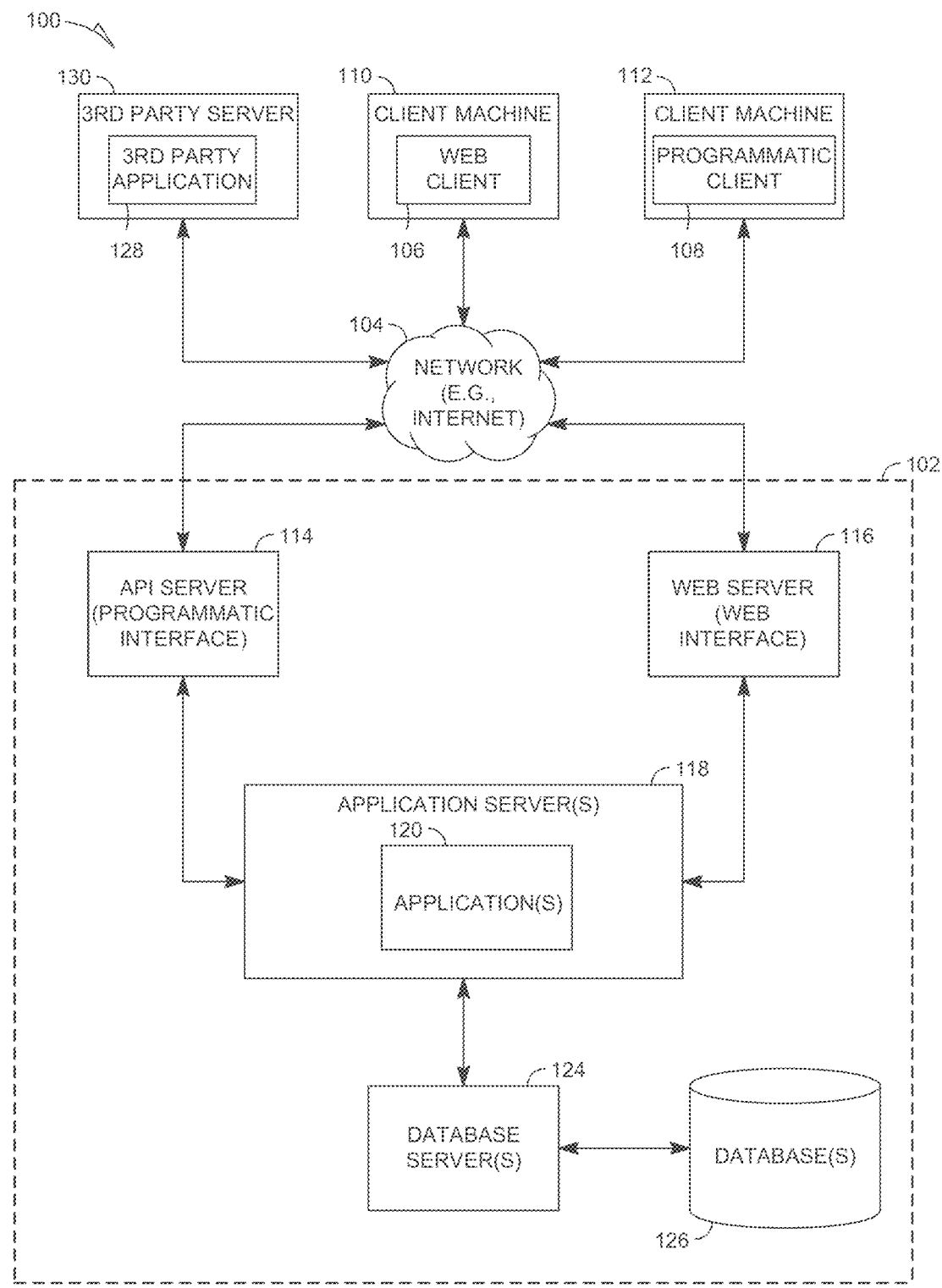
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Historically, models to rank potential feed items have heavily utilized text and entity-based features extracted from the feed items to derive a global ranking or recommendation. An example of such models is a Generalized Linear Model (GLM). A GLM is a generalization of linear regression that allows for response variables that have error distribution models other than a normal distribution. The GLM generalizes linear regression by allowing the linear model to be related to the response variable via a link function and by allowing the magnitude of the variance of each measurement to be a function of its predicted value.

GLMs may utilize the following prediction formula: $g(\mathbb{E}[y_{ij}]) = x'_{ij} w$, where this formula predicts the response of user i to item j, and $x_{ij}$ is a feature vector, w is a coefficient vector, $\mathbb{E}[y_{ij}]$ is an expectation of response, and $g()$ is a link function.

However, in scenarios where data is abundant, having a more fine-grained model at the user or item level would potentially lead to more accurate predictions, as the user's personal preferences on items and the item's specific attraction for users could be better captured.

In an example embodiment, a solution for better capturing a user's personal preference for items and an item's specific attraction for users in prediction/recommender systems is provided by introducing member-level regression coefficients in addition to the global regression coefficients in a GLM setting. This is termed a generalized linear mixed model (GLMix).

In an example embodiment, a GLMix model is utilized that models viewers and actors of feed items. This allows for random effects of individual viewers and actors to be taken into account without introducing biases.

Additionally, in an example embodiment, predictions/recommendations are made even more accurate by using three models instead of a single GLMix model. Specifically, rather than having a single GLMix model with different coefficients for viewers and actors, three separate models are used and then combined. Each of these models has different granularities and dimensions. A global model may model the similarity between user attributes (e.g., from the member profile or activity history) and item attributes. A per-viewer model may model user attributes and activity history of actors on feed items. A per-actor model may model user attributes and activity history of the viewers of feed items. The per-actor model may, therefore, rely on information regarding how and what type of viewers interacted with items acted on by the particular actor.

Such a model may be termed a Generalized Additive Mixed Effect (GAME) model. For purposes of this disclosure, the actor of the potential feed item is the user who performs an action via a user interface of the social networking service that causes the item to be considered as a potential feed item. Examples of such actions may include updating a member profile, sharing a potential feed item, liking a potential feed item, publishing an article, and the like.

In the context of a potential feed item ranking or recommendation, this results in the following components:
- a global model that captures the general behavior of how members interact with feed items
- a viewer-specific model with parameters (to be learned from data) specific to the given member to capture member's personal behavior with respect to viewing feed items, and
- an actor-specific model with parameters (to be learned from data) specific to the actor on the specific potential feed item to capture the actor member's personal behaviour with respect to acting on feed items as well as behaviour of viewers of feed items acted upon by the actor member.

The following is a description of how a GAME model enables such a level of personalization. Let $y_{mjt}$ denote the binary response of whether user m would interact (e.g., click on) an item acted upon by actor j in context t, where the context usually includes the time and location when the item is shown. $q_m$ is used to denote the feature vector of user m, which includes the features extracted from the user's public profile, e.g., the member's title, job function, education history, industry, and the like, as well as past feed interaction history. $s_j$ is used to denote the feature vector of actor j, which includes the features extracted from the actor's public profile, e.g., the member's title, job function, education history, industry, and the like, as well as past feed actor history, including attributes of and interactions by users who previously interacted with items acted on by the actor. Let $x_{mjt}$ represent the overall feature vector for the (m, j, t) triple, which can include $q_m$ and $s_j$ for feature-level main effects, the outer product between $q_m$ and $s_j$ for interactions among viewer and actor features, and features of the context. It may be assumed that $x_{mjt}$ does not contain member Identifications (ID)s as features, because IDs will be treated differently from regular features. The GAME model for predicting the probability of user m interacting with a feed item acted upon by actor j using logistic regression is:

$$E[y_{mjt}]=x'_{mjt}b+s'_j\alpha_m+q'_m\beta_j$$

where b is the global coefficient vector (also called fixed effect coefficients); and $\alpha_m$ and $\beta_j$ are the coefficient vectors specific to viewer m and actor j, respectively. $\alpha_m$ and $\beta_j$ are called random effect coefficients, which capture viewer m's personal preference on different item features and items acted upon by actor j's attraction for different member features. For a viewer m with many responses to different items in the past, this is able to accurately estimate his or her personal coefficient vector $\alpha_m$ and provide personalized predictions. On the other hand, if viewer m does not have much past response data, the posterior mean of $\alpha_m$ will be close to zero, and the model for user m will fall back to the global fixed effect component $x'_{mjt}b$. The same behavior applies to the per-actor coefficient vector $\beta_j$.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
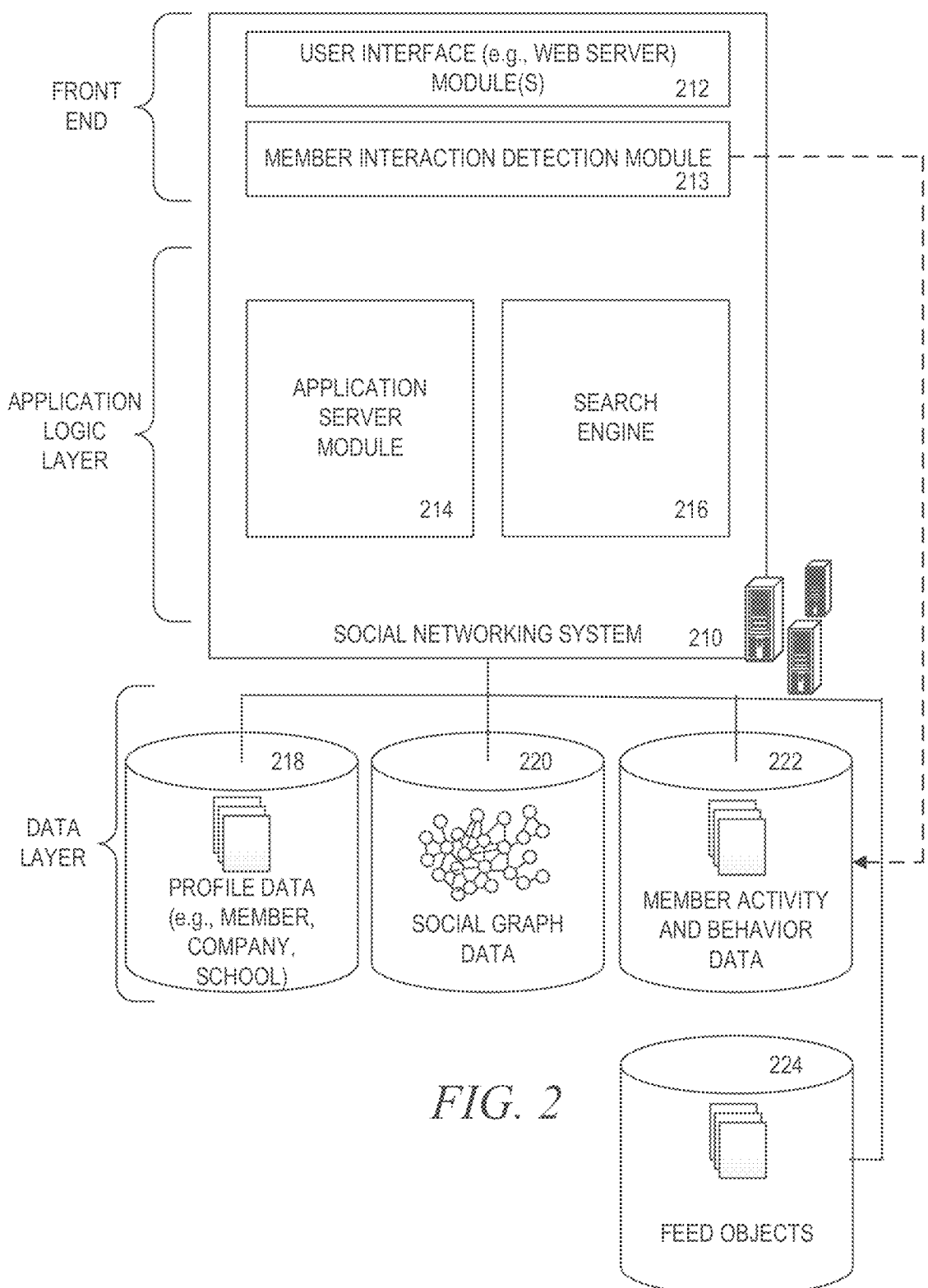
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking system 210 consistent with some embodiments of the present disclosure. In some embodiments, a search engine 216 may reside on the application server(s) 118 shown in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218 or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing of and searching for content within the social networking service, such as the indexing of and searching for data or information contained in the data layer, such as profile data (stored, e.g., in the profile database 218), social graph data (stored, e.g., in the social graph database 220), and member activity and behavior data (stored, e.g., in the member activity and behavior database 222), and/or information in a feed objects database 224. The search engine 216 may collect, parse, and/or store data in an index or other similar structure to facilitate the identification and retrieval of information in response to received queries for information. This may include, but is not limited to, forward search indexes, inverted indexes, N-gram indexes, and so forth.

The feed objects database 224 may contain objects that can be displayed in feeds of one or more members of the social networking service. A feed is a data format used for providing users with frequently updated content. In the social networking service, members may view their feed when they, for example, log into the social networking service. The feed contains one or more objects that the social networking service believes may be of interest to the user. The user feed may contain items from different categories, e.g., job postings, user postings, suggestions for new connections, sponsored posts, and the like. Creating the feed means ranking the items from the different categories, merging the items from the different categories, and creating the user feed, which presents the items in sequential order.

The process of ranking items and categories is often very complex, as different goals are desired, such as optimizing user experience and generating revenue from the different categories. This process is often tedious and requires a great deal of experimentation.

While the feed objects database 224 is depicted here as containing the feed objects, it should be noted that it is not necessary that all of these potential feed objects be aggregated in a single database. In some example embodiments, the feed objects may be located in various other databases either in lieu of or in addition to the feed objects database 224, and whatever component desires to access feed objects, such as the search engine 216, can retrieve the feed objects across multiple databases. For simplicity, however, the present document will describe feed objects as being obtained from the feed objects database 224.

Figure 3:
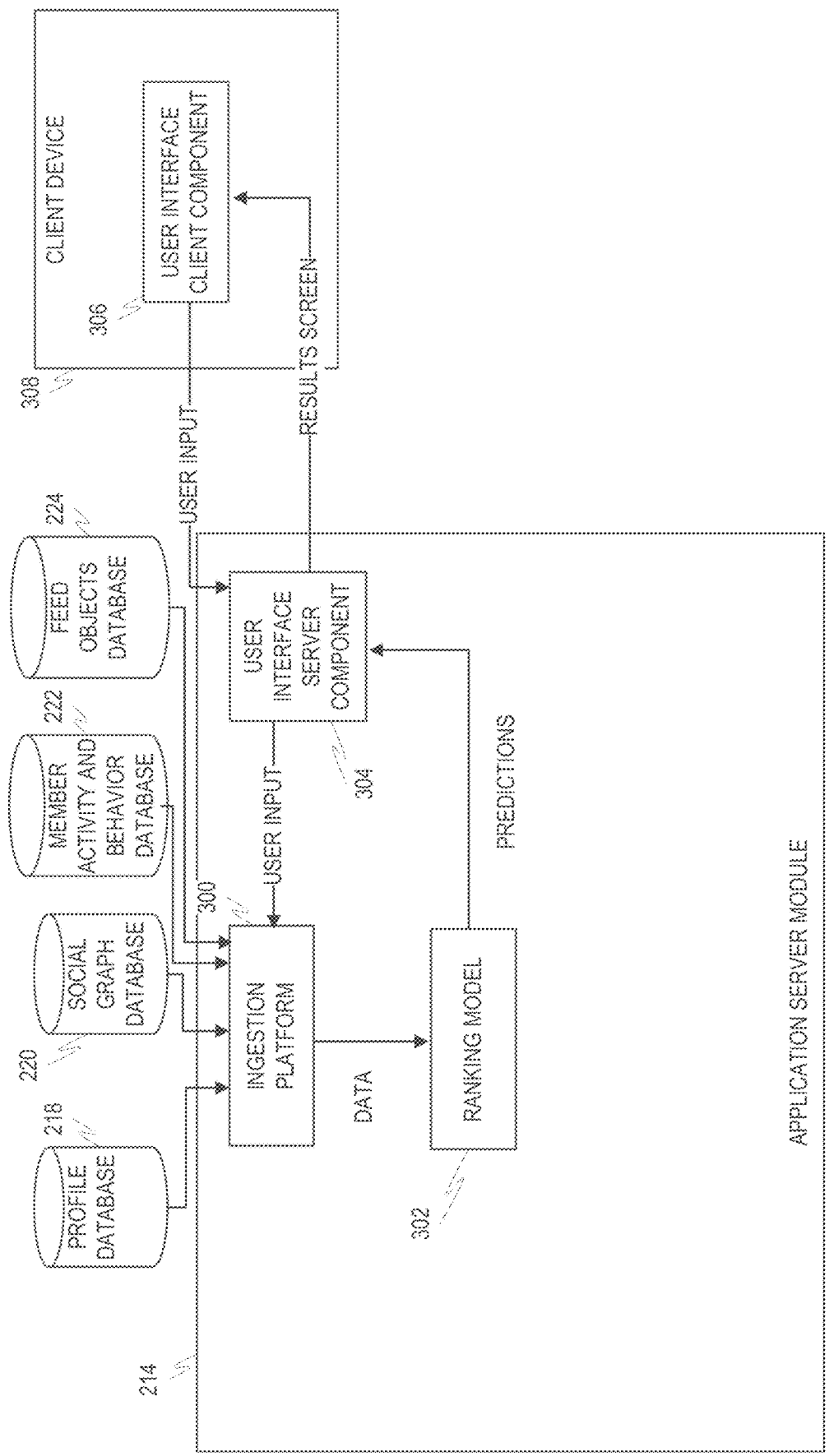
FIG. 3 is a block diagram illustrating an application server module of FIG. 2 in more detail, in accordance with an example embodiment.

FIG. 3 is a block diagram illustrating the application server module 214 of FIG. 2 in more detail, in accordance with an example embodiment. While in many embodiments, the application server module 214 will contain many subcomponents used to perform various different actions within the social networking system 210, in FIG. 3 only those components that are relevant to the present disclosure are depicted.

Here, an ingestion platform 300 obtains information from the profile database 218, the social graph database 220, the member activity and behavior database 222, and/or the feed objects database 224 relevant to a ranking model 302. At training time, the ingestion platform 300 sends this information to the ranking model 302 in order to train the ranking model 302, whereas at ranking time, such as when a social networking service needs to determine which feed objects to present to a particular user and in what order, the ingestion platform 300 sends information to the ranking model 302 in order to allow the ranking model 302 to output a ranking of the various potential feed objects to be displayed in the user's feed.

In some example embodiments, this information is transmitted in the form of feature vectors. For example, each member profile may have its own feature vector formed of the information in the profile database 218, the social graph database 220, and the member activity and behavior database 222. In other example embodiments, the ingestion platform 300 sends raw information to the ranking model 302, and the ranking model 302 creates its own feature vectors from the raw information.

A user interface server component 304 communicates with a user interface client component 306 located on a client device 308 to run the ranking model 302 and use its results to display or update a feed to a user. This may be performed in response to a user input, such as a navigation input to a web page that includes the feed. For example, a user could instruct the user interface client component 306 to log into a social networking service account. This log-in information could then be sent to the user interface server component 304, which can use this information to instruct the ingestion platform 300 to retrieve the appropriate information from the profile database 218, the social graph database 220, the member activity and behavior database 222, and/or the feed objects database 224.

The results from the ranking model 302 could then be sent to the user interface server component 304, which, along with the user interface client component 306, could select and format appropriate feed objects for display to the user. Details about how these objects could be displayed on the client device 308 via the user interface client component 306 will be described in more detail below.

Figure 4:
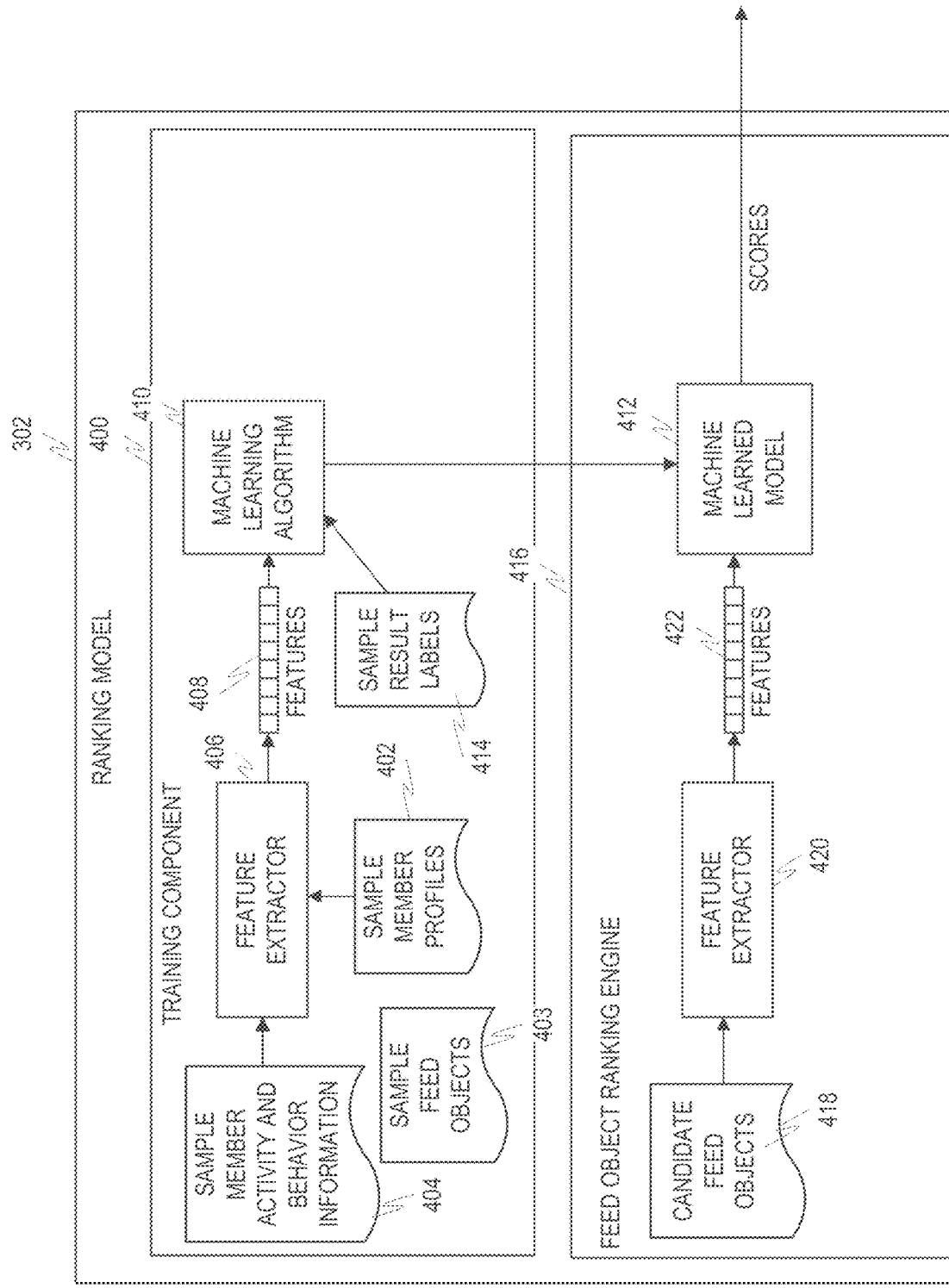
FIG. 4 is a block diagram illustrating the job posting result ranking engine of FIG. 3 in more detail, in accordance with an example embodiment.

FIG. 4 is a block diagram illustrating the ranking model 302 of FIG. 3 in more detail, in accordance with an example embodiment. In a training component 400, sample member profiles 402, sample feed objects 403, and/or sample member activity and behavior information 404 are input to a feature extractor 406, which acts to extract curated features 408 from the sample member profiles 402, sample feed objects 403, and/or sample member activity and behavior information 404. A feature is a variable pertaining to an input piece of data. Since the input may, in some example embodiments, be data related to a member of a social networking service, such as a member profile, member usage and/or activity data, or social graph information, the feature may be, for example, a portion of the member profile, member usage and/or activity data, or social graph. The feature may also be a variable calculated from a portion of the data, such as an average, sum, difference, measurement, and the like. The feature may also be some aspect of the sample feed objects, such as title, frequently appearing terms, and/or various metrics about the object, such as frequency of occurrence of key words.

In an example embodiment, the curated features 408 are then used as input to a machine learning algorithm 410 to train a machine learned model 412 to generate a probability that a feed object should be displayed to a particular user. While this probability may be based on the likelihood that the user may interact in some way with the feed object, as will be described in more detail below, it may also be based on the effect of viral actions by the user or downstream users, as well as the relative value of these effects on the social networking service as a whole. In certain types of machine learning algorithms, the training may include providing sample result labels 414 to the machine learning algorithm 410. Each of these sample result labels 414 is a score indicating a likelihood that a corresponding sample feed object should be displayed to a user.

The machine learning algorithm 410 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

In a feed object ranking engine 416, candidate feed objects 418 are input to a feature extractor 420, which acts to extract curated features 422 from the candidate feed objects 418. The curated features 422 are then used as input to the machine learned model 412, which outputs a score indicating the likelihood that the corresponding candidate feed objects 418 should be displayed in the feed.

In an example embodiment, the machine learned model 412 is trained in such a manner that it is able to output a score for each potential feed item. The score generated by the machine learned model 412 may be called "expected engagement."

While the above describes how the expected engagement is generated by the machine learned model 412, in example embodiments the machine learned model 412 is actually a combination of multiple models, specifically a combination of a global model (also called a fixed effects model) and one or more local models (also called random effects models). As such, the training described in FIG. 4 may actually comprise different trainings of the different models that comprise the machine learned model 412.

Figure 5:
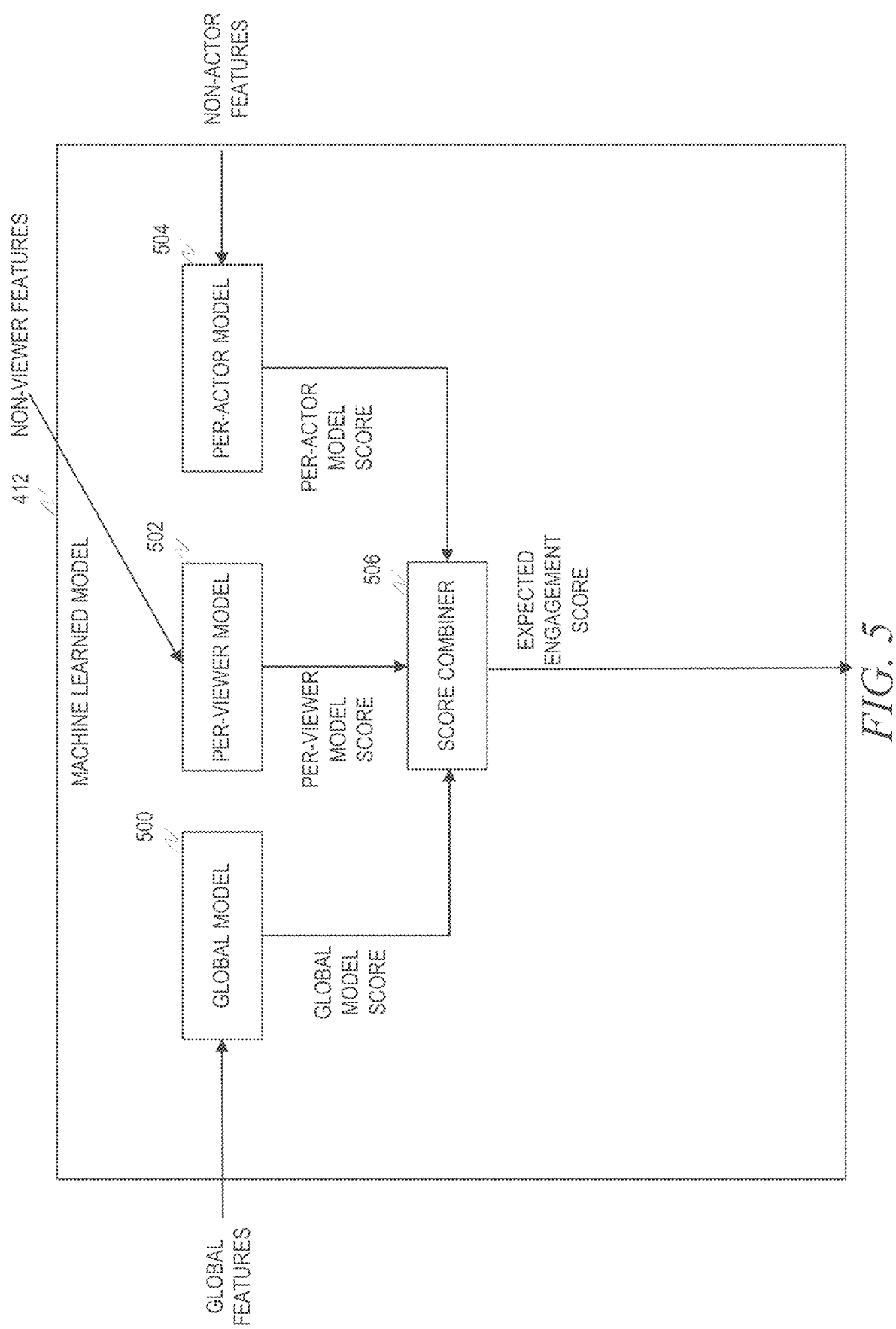
FIG. 5 depicts the machine learned model 412 of FIG. 4 in more detail, in accordance with an example embodiment.

FIG. 5 depicts the machine learned model 412 of FIG. 4 in more detail, in accordance with an example embodiment. Here, machine learned model 412 includes a global model 500, a per-viewer model 502, and a per-actor model 504. While not depicted here, in some example embodiments an additional per-item model may be added as well, corresponding to each potential feed item, or at least each category of potential feed item (e.g., article, job posting, status update, etc.).

The global model 500 may be trained using training data that includes data about many different viewers and many different actors. The per-viewer model 502 may be trained using data about different actors for items that the viewer has interacted with. The per-actor model 504 may be trained using data about different viewers for items that the actor has acted on. A score combiner 506 may be used to combine scores output by the models 500, 502, and 504 into a single expected engagement score for an individual potential feed item. It should be noted that the score combiner 506 may assign weights to each of the different models 500-504, and these weights may be learned via a machine learning algorithm. As such, in certain circumstances (such as, for example, based on some feature of the potential feed item, like category, location, etc.), the weight for the per-viewer model may be higher than the weight for the per-actor model, whereas in other circumstances, the weight for the per-viewer model may be lower than the weight for the per-actor model.

A cold start problem may exist in some technical circumstances where, for example, the reliability of one of the random effect models 502, 504 may be in doubt due to lack of sufficient training data. In order to remedy this technical problem, a threshold may be utilized where the weight of a particular random effect model 502, 504 may be set at 0 until some threshold amount of training data is obtained.

At runtime, when the ranking for a set of potential feed items needs to be determined, each candidate feed item 418 may have features extracted from it and input to the machine learned model 412. This information may include information about the potential viewer and the actor on the potential feed item (although in some circumstances the information about the potential viewer and the actor on the potential feed item may be submitted to the machine learned model 412 independently from the candidate feed objects 418 and/or each other).

The relevant information may then be input to each of the individual models 500-504 within the machine learned model 412, which each model outputs a score that can be weighted by the score combiner 506, which then combines the weighted scores to output the expected engagement score for the particular potential feed item. The expected engagement scores may then be used to rank the potential feed items and determine which potential feed items to display and in what order.

Examples of global features include recent clicks or viral actions (e.g., sharing, liking, etc.) on a feed item, network size of the actor and/or viewer, actor/viewer interactions, impressions based on different sliding windows, endorsements of or by the viewer/actor, a "newsworthiness" score for a feed item (most relevant to articles, with the newsworthiness score generally indicating how newsworthy the article is), feed position, age of the feed item, size of the viewer's network, a job seeker score for the viewer (indicating how likely the viewer is to be seeking a job), location of the viewer and/or actor, amount of time since the viewer and/or actor has interacted with the social networking service, connection strength of connections of the viewer and/or actor, and various profile features of the viewer and/or actor, activity type, item popularity, item age, and so forth.

It should be noted that the GAME-type use of multiple models is only one example embodiment. In another example embodiment, A GLMix model is used with fixed effects similar to a global model with a random effect being incorporated for each viewer and actors in a central GLMix model. In this case, the model may be segmented by first partitioning based on per viewer $\mathcal{P}=\{\mathcal{P}_1, \ldots, \mathcal{P}_V\}$ then partitioning based on per actor $Q=\{Q_1, \ldots, Q_A\}$ with the problem being represented as $$(\theta^*, \theta_1^*, \ldots, \theta_V^*, \beta_1^*, \ldots, \beta_A^*) =$$

$$\arg\min_{(\theta, \theta_1, \ldots, \theta_V, \beta_1, \ldots, \beta_A)} \sum_{a=1}^{A} \sum_{v=1}^{V} \left( \sum_{(y_n, x_n^*, \hat{x}_n, \bar{x}_n)} f(y_n, \theta' \hat{x}_n + \theta_V' \bar{x}_n + \beta_a' \tilde{x}_n) + g(\theta_V) + g(\beta_a) \right) + g(\theta)$$

with each training sample $(y_n, \hat{x}_n, \bar{x}_n, \tilde{x}_n)$ comprising three types of features, where $\hat{x}_n$ is used to learn the global parameter, $\bar{x}_n$ is used to learn the viewer-specific parameters, and $\tilde{x}_n$ is used to learn actor-specific parameters. It should also be noted that this type of model can be extended to other "per-" categories, such as per-topic, per-industry, etc.

In an example embodiment, each effect (global or local) may be trained independently from one another. For example, the global and per-actor models may be fixed while the per-viewer model is trained. In another example embodiment, the global and per-actor models are trained offline, whereas the per-viewer model is trained each time a feed is viewed. For each of the models, the newly trained version of the model may be compared to an older model and replace the older model only if a performance upgrade is detected.

Figure 6:
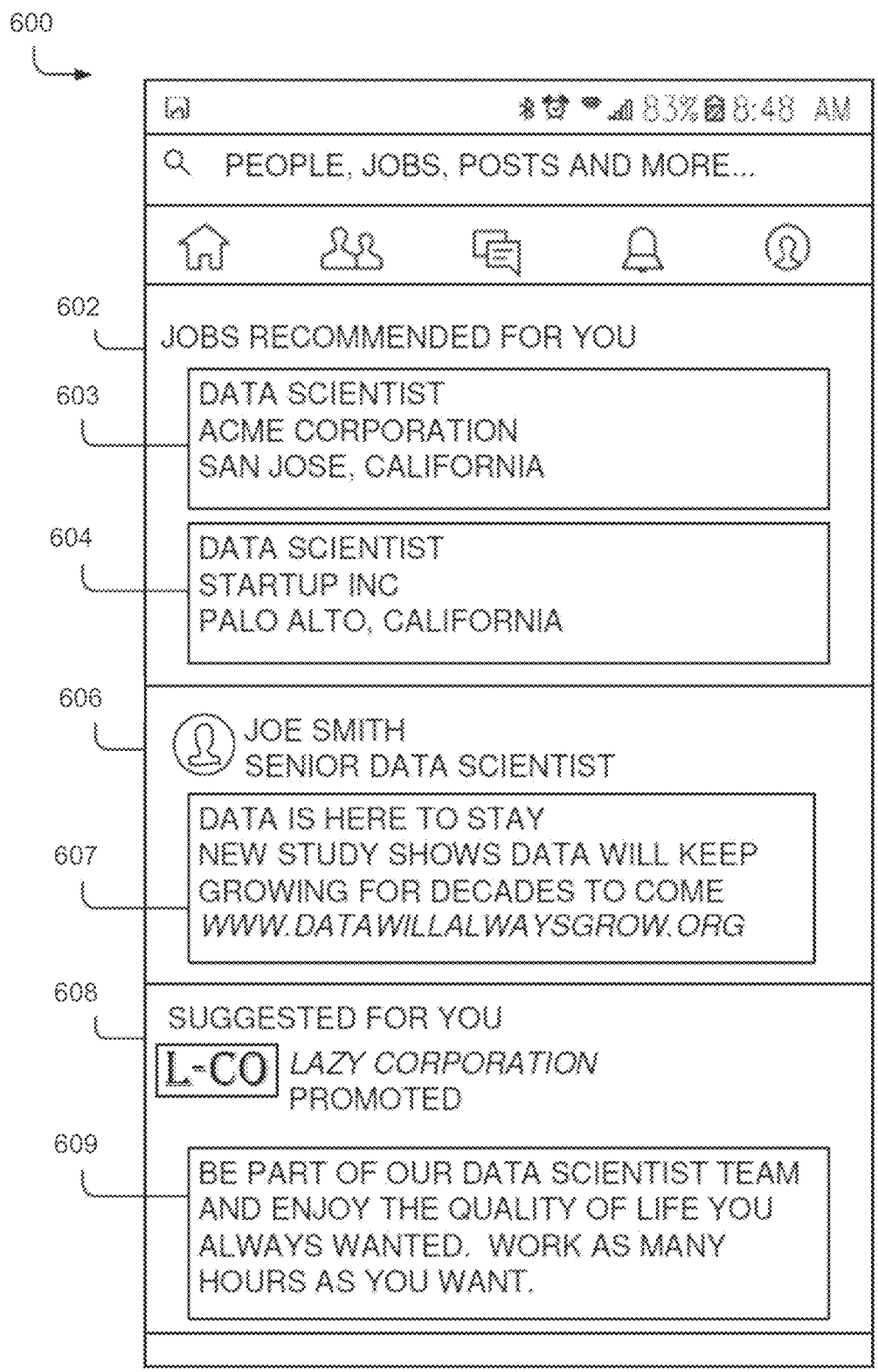
FIG. 6 is a screenshot of a user feed 600 that includes items in different categories, according to some example embodiments.

FIG. 6 is a screenshot of a user feed 600 that includes items in different categories, according to some example embodiments. In the example embodiment of FIG. 6, the user feed 600 includes different categories, such as job recommendations 602, user posts 606, and sponsored items 608, and other embodiments may include additional categories.

In one example embodiment, the user feed 600 provides the job recommendations 602 (e.g., job posts 603 and 604) that match the job interests of the user and that are presented with a specific job search request from the user.

The user posts 606 include items 607 posted by users of the social networking service, such as connections of the user, to make comments on the social networking service or include articles or webpages of interest.

The sponsored items 608 are items 609 placed by sponsors of the social networking service, which pay a fee for posting those items on user feeds, and may include advertisements or links to webpages that the sponsors want to promote.

Although the categories are shown as separated within the user feed 600, the items from the different categories may be intermixed, and not just be presented as a block. Thus, the user feed 600 may include a large number of items from each of the categories, and the social networking service decides the order in which these items are presented to the user based on the desired utilities.

Figure 7:
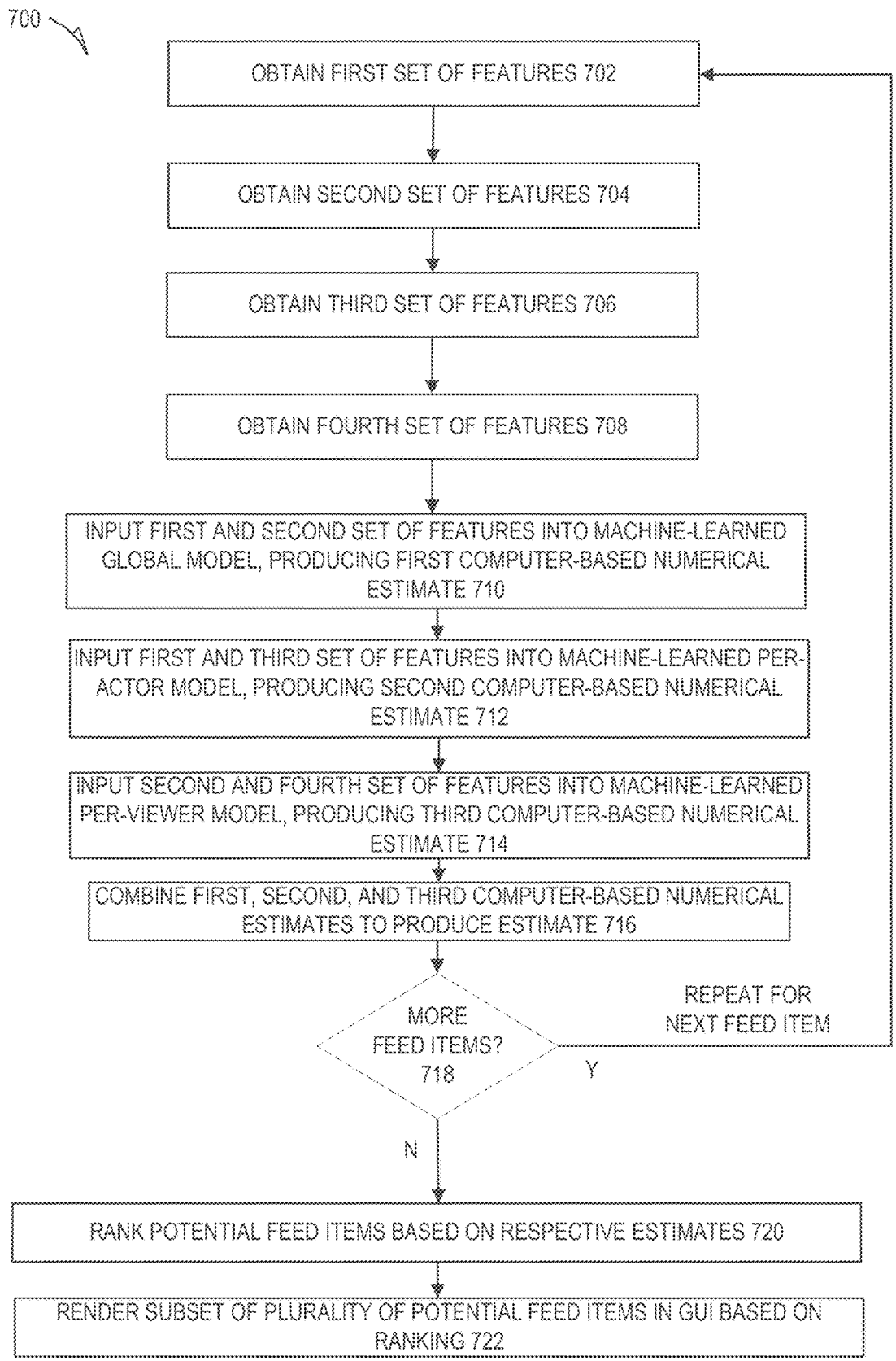
FIG. 7 is a flow diagram illustrating a method 700 for using a generalized additive mixed effect model in accordance with an example embodiment.

FIG. 7 is a flow diagram illustrating a method 700 for using a generalized additive mixed effect model, in accordance with an example embodiment. A loop is begun for each of a plurality of potential feed items to display in a feed in a graphical user interface of a social networking service. These potential feed items may be retrieved, for example, based on a search algorithm for the viewer of the graphical user interface. At operation 702, a first set of features derived from attributes of the first user in a social networking service is obtained. At operation 704, a second set of features derived from attributes of a second user in the social networking service is obtained, the second user being an actor on the potential feed item. At operation 706, a third set of features derived from activity of the first user, with respect to a plurality of feed items in the social networking service, is obtained. At operation 708, a fourth set of features derived from activity of the second user, with respect to a plurality of feed items in the social networking service, is obtained.

At operation 710, the first and second sets of features are input into a machine-learned global model, producing a first computer-based numerical estimate of expected engagement of the first user with the potential feed item. At operation 712, the first and third sets of features are input into a machine-learned per-actor model, producing a second computer-based numerical estimate of expected engagement of the first user with the potential feed item. At operation 714, the second and fourth sets of features are input into a machine-learned per-viewer model, producing a third computer-based numerical estimate of expected engagement of the first user with the potential feed item. At operation 716, the first, second, and third computer-based numerical estimates are combined to produce an estimate of a likelihood that the first user will engage in an activity with the potential feed item in the social networking service.

At operation 718, it is determined if there are any more potential feed items. If so, then the method 700 loops back to operation 702 for the next potential feed item. If not, then the method 700 advances to operation 720.

At operation 720, the potential feed items are ranked based on their respective estimates of the likelihood that the first user will engage in an activity with the potential feed item in the social networking service. At operation 722, a subset of the plurality of potential feed items are rendered in the graphical user interface (GUI), based on the ranking.

Figure 8:
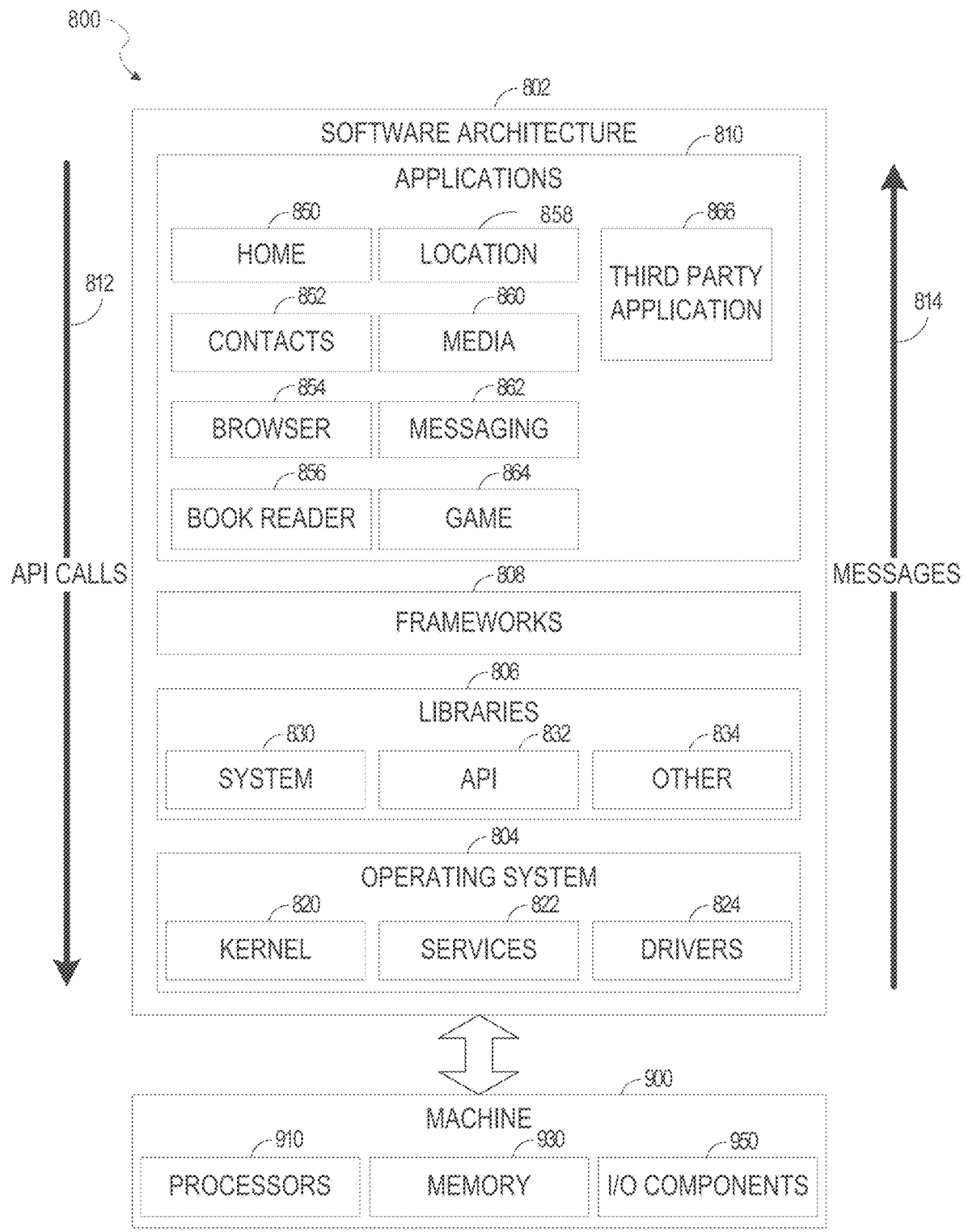
FIG. 8 is a block diagram illustrating a software architecture, in accordance with an example embodiment.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 10 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
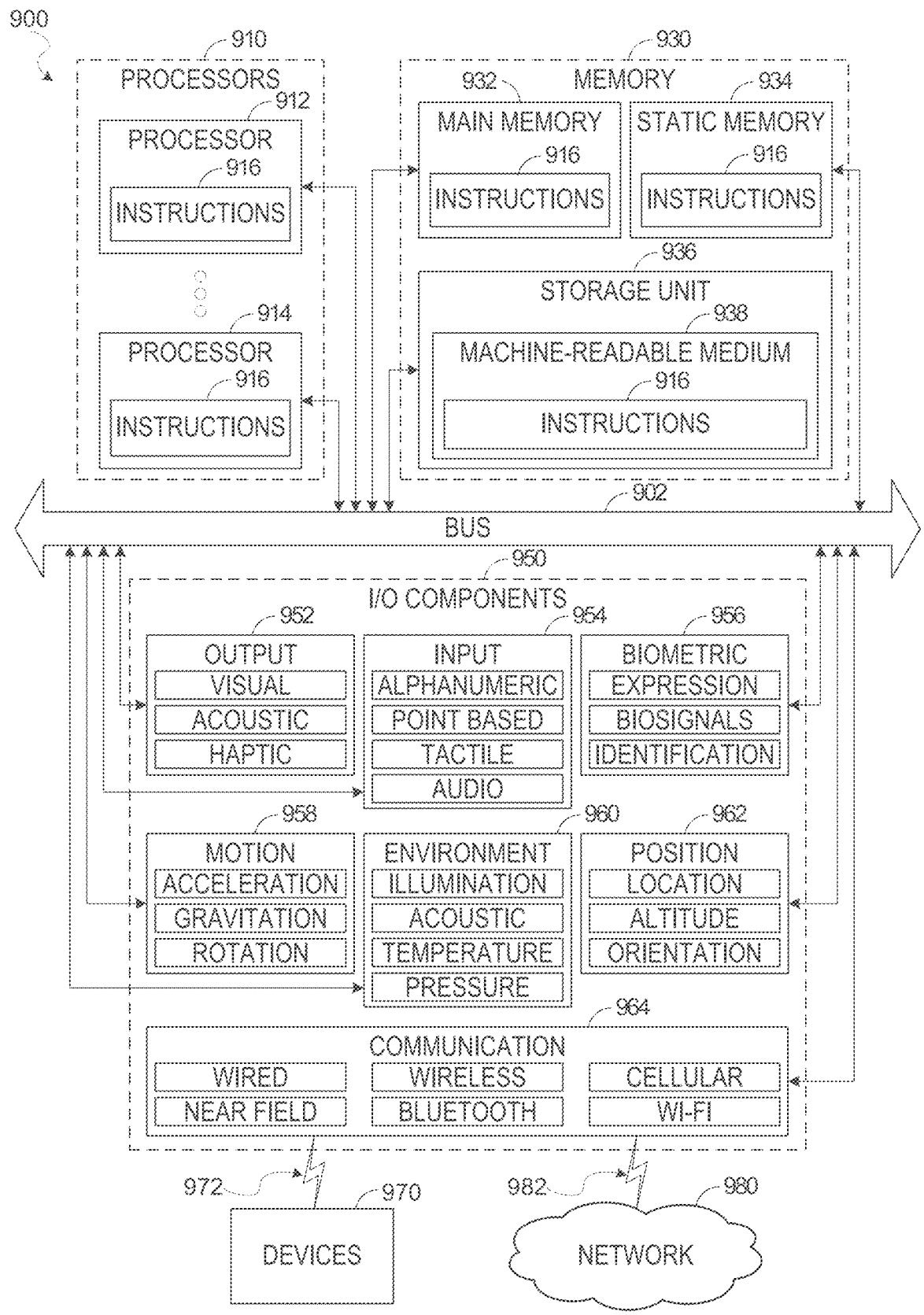
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine to perform any one or more of the methodologies discussed herein, according to an example embodiment. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein may be executed. For example, the instructions 916 may cause the machine 900 to execute the method 700 of FIG. 7 Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 ay include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910 and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to the processors 910. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 916 may be transmitted or received over the network 980 using a transmission medium via a network interface device (e.g., a network interface component included in the communication components 964 and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system for rendering a feed in a graphical user interface of a computing device display viewed by a first user, comprising:
a non-transitory computer-readable medium having instructions stored thereon, which, when executed by a processor, cause the system to:
for each of a plurality of potential feed items:
obtain a first set of features derived from attributes of the first user in a social networking service;
obtain a second set of features derived from attributes of a second user in the social networking service, the second user being an actor on the potential feed item;
obtain a third set of features derived from activity of the first user, with respect to a plurality of feed items in the social networking service;
obtain a fourth set of features derived from activity of the second user, with respect to a plurality of feed items in the social networking service;
input the first and second sets of features into a machine-learned global model, producing a first computer-based numerical estimate of expected engagement of the first user with the potential feed item;
input the first and third sets of features into a machine-learned per-actor model, producing a second computer-based numerical estimate of expected engagement of the first user with the potential feed item;
input the second and fourth sets of features into a machine-learned per-viewer model, producing a third computer-based numerical estimate of expected engagement of the first user with the potential feed item; and
combine the first, second, and third computer-based numerical estimates to produce an estimate of a likelihood that the first user will engage in an activity with the potential feed item in the social networking service.

2. The system of claim 1, herein the machine-learned per-actor model and the machine-learned per-viewer model are partitions of the machine-learned global model.

3. The system of claim 1, wherein the machine-learned global model is a fixed effect model.

4. The system of claim 1, wherein the machine-learned per-user model and the machine-learned per-item model are random effect models.

5. The system of claim 1, wherein the instructions further cause the system to determine to place the first item in a feed of the first user based on the estimate of the likelihood that the first user will engage in an activity with the first item in the social networking service.

6. The system of claim 1, wherein the instructions further cause the system to rank the first item among other potential items to serve to the first user based on the estimate of the likelihood that the first user will engage in an activity with the first item in the social networking service, and serving the first item based on the ranking.

7. The system of claim 1, wherein the machine-learned global model, machine-learned per-actor model, and machine-learned per-viewer model are each trained independently from one another.

8. A computerized method for rendering a feed in a graphical user interface of a computing device display viewed by a first user comprising:
obtaining a first set of features derived from attributes of the first user in a social networking service;
obtaining a second set of features derived from attributes of a second user in the social networking service, the second user being an actor on the potential feed item;
obtaining a third set of features derived from activity of the first user, with respect to a plurality of feed items in the social networking service;
obtaining a fourth set of features derived from activity of the second user, with respect to a plurality of feed items in the social networking service;
inputting the first and second sets of features into a machine-learned global model, producing a first computer-based numerical estimate of expected engagement of the first user with the potential feed item;
inputting the first and third sets of features into a machine-learned per-actor model, producing a second computer-based numerical estimate of expected engagement of the first user with the potential feed item;
inputting the second and fourth sets of features into a machine-learned per-viewer model, producing a third computer-based numerical estimate of expected engagement of the first user with the potential feed item; and
combining the first, second, and third computer-based numerical estimates to produce an estimate of a likelihood that the first user will engage in an activity with the potential feed item in the social networking service.

9. The method of claim 8, wherein the machine-learned per-actor model and the machine-learned per-viewer model are partitions of the machine-learned global model.

10. The method of claim 8, wherein the machine-learned global model is a fixed effect model.

11. The method of claim 8, wherein the machine-learned per-user model and the machine-learned per-item model are random effect models.

12. The method of claim 8, further comprising determining to place the first item in a feed of the first user based on the estimate of the likelihood that the first user will engage in an activity with the first item in the social networking service.

13. The method of claim 8, further comprising ranking the first item among other potential items to serve to the first user based on the estimate of the likelihood that the first user will engage in an activity with the first item in the social networking service, and serving the first item based on the ranking.

14. The method of claim 8, wherein the machine-learned global model, machine-learned per-actor model, and machine-learned per-viewer model are each trained independently from one another.

15. A non-transitory machine-readable storage medium comprising instructions which, when implemented by one or more machines; cause the one or more machines to perform operations for rendering a feed in a graphical user interface of a computing device display viewed by a first user, the operations comprising:

obtaining a first set of features derived from attributes of the first user in a social networking service;

obtaining a second set of features derived from attributes of a second user in the social networking service, the second user being an actor on the potential feed item;

obtaining a third set of features derived from activity of the first user; with respect to a plurality of feed items in the social networking service;

obtaining a fourth set of features derived from activity of the second user, with respect to a plurality of feed items in the social networking service;

inputting the first and second sets of features into a machine-learned global model, producing a first computer-based numerical estimate of expected engagement of the first user with the potential feed item;

inputting the first and third sets of features into a machine-learned per-actor model, producing a second computer-based numerical estimate of expected engagement of the first user with the potential feed item;

inputting the second and fourth sets of features into a machine-learned per-viewer model, producing a third computer-based numerical estimate of expected engagement of the first user with the potential feed item; and combining the first, second, and third computer-based numerical estimates to produce an estimate of a likelihood that the first user will engage in an activity with the potential feed item in the social networking service.

16. The non-transitory machine-readable storage medium of claim 15, wherein the machine-learned per-actor model and the machine-learned per-viewer model are partitions of the machine-learned global model.

17. The non-transitory machine-readable storage medium of claim 15, wherein the machine-learned global model is a fixed effect model.

18. The non-transitory machine-readable storage medium of claim 15, wherein the machine-learned per-user model and the machine-learned per-item model are random effect models.

19. The non-transitory machine-readable storage medium of claim 15, wherein the operations further comprise determining to place the first item in a feed of the first user based on the estimate of the likelihood that the first user will engage in an activity with the first item in the social networking service.

20. The non-transitory machine-readable storage medium of claim 15, wherein the operations further comprise ranking the first item among other potential items to serve to the first user based on the estimate of the likelihood that the first user will engage in an activity with the first item in the social networking service, and serving the first item based on the ranking.

\* \* \* \* \*